US012630072B2

(12) United States Patent
Harada et al.

(10) Patent No.: US 12,630,072 B2
(45) Date of Patent: May 19, 2026

(54) VEHICLE LAMP SYSTEM

(71) Applicant: Koito Manufacturing Co., Ltd., Tokyo (JP)

(72) Inventors: Tomoaki Harada, Shizuoka (JP); Yoshihisa Endo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/959,820

(22) Filed: Nov. 26, 2024

(65) Prior Publication Data

US 2025/0083588 A1      Mar. 13, 2025

Related U.S. Application Data

(63) Continuation of application No. PCT/JP2023/019701, filed on May 26, 2023.

(30) Foreign Application Priority Data

May 26, 2022    (JP) .................................. 2022-086353

(51) Int. Cl.
*B60Q 1/00*          (2006.01)
*B60R 11/00*          (2006.01)
(Continued)

(52) U.S. Cl.
CPC ............ *B60Q 1/0023* (2013.01); *B60R 11/00* (2013.01); *B60R 11/04* (2013.01); *F21S 41/663* (2018.01);
(Continued)

(58) Field of Classification Search
CPC ..... B60Q 1/0023; B60Q 1/143; F21S 41/663; B60R 11/00; B60R 11/04
See application file for complete search history.

(56) References Cited

U.S. PATENT DOCUMENTS 10,509,973 B2 * 12/2019 Takemura .............. G08G 1/167
11,325,523 B2 * 5/2022 Dingli ...................... B60Q 1/18
(Continued)

FOREIGN PATENT DOCUMENTS

EP        3858673 A1    8/2021
JP        2014004913 A    1/2014
(Continued)

OTHER PUBLICATIONS

International Preliminary Report on Patentability (Form PCT/IB/373) and the Written Opinion of the International Searching Authority (Form PCT/ISA/237) issued on Nov. 7, 2024, by the International Bureau of WIPO in corresponding International Application No. PCT/JP2023/019701. (8 pages).
(Continued)

*Primary Examiner* — Matthew J. Peerce
(74) *Attorney, Agent, or Firm* — BUCHANAN, INGERSOLL & ROONEY PC

(57)          ABSTRACT
A vehicle lamp system is used with a visible light camera. The vehicle lamp system has a white low-beam lamp, a white high-beam lamp, and a white imaging lamp. The visible light camera has an imaging range wider than an illumination range of the low-beam lamp. The imaging lamp has an illumination range wider than the imaging range of the visible light camera.

4 Claims, 4 Drawing Sheets

(51) Int. Cl.
  B60R 11/04    (2006.01)
  F21S 41/663    (2018.01)
  F21W 102/13    (2018.01)

(52) U.S. Cl.
  CPC ................. *B60R 2011/0008* (2013.01); *B60R 2011/0028* (2013.01); *F21W 2102/13* (2018.01)

(56)      References Cited

U.S. PATENT DOCUMENTS

| | | | |
|---|---|---|---|
| 11,712,992 B2 * | 8/2023 | Mock ................... | G01J 1/0228 |
| | | | 315/82 |
| 2021/0162916 A1 | 6/2021 | Ikenouchi et al. | |

FOREIGN PATENT DOCUMENTS

| | | | |
|---|---|---|---|
| JP | 2020147251 A | 9/2020 | |
| JP | 2021088233 A | 6/2021 | |

OTHER PUBLICATIONS

International Search Report (Form PCT/ISA/210) issued on Jun. 27, 2023, by the Japanese Patent Office in corresponding International Application No. PCT/JP2023/019701. (5 pages).

Extended European Search Report issued on Jul. 2, 2025, in corresponding European Patent Application No. 23811899.6. (7 pages).

* cited by examiner

VEHICLE LAMP SYSTEM

BACKGROUND

1. Technical Field

The present disclosure relates to a vehicle lamp system.

2. Description of the Related Art

A sensing system for sensing position and type of any object around a vehicle has been mounted, for enabling automatic driving or automatic control of light distribution of a head lamp. A visible light camera has been widely used in the sensing system, for its capability of acquiring color information and low cost.

The camera has become highly sensitive in these years, thus making it possible to capture an object under faint light. Even a high-sensitivity camera is, however, difficult to capture the object, in a suburb without street lamps.

In the nighttime with the head lamp lit on, the object within an illumination range of the head lamp may be captured. Meanwhile in a case where the field of view of the camera is wider than the illumination range of the head lamp, the object outside of the illumination range cannot be captured due to underexposure.

SUMMARY

The present disclosure has been made considering such situation, and one of exemplary purposes of an aspect of the present disclosure is to provide a vehicle lamp system that enables imaging with a visible light camera even in the dark.

One aspect of the present disclosure relates to a vehicle lamp system for use with a visible light camera. The vehicle lamp system has a white low-beam lamp, a white high-beam lamp, and a white imaging lamp. The visible light camera has an imaging range wider than an illumination range of the low-beam lamp; the imaging lamp has an illumination range that covers the imaging range of the visible light camera; and the imaging lamp has intensity lower than intensity of the low-beam lamp.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Outline of Embodiments

Figure 1:
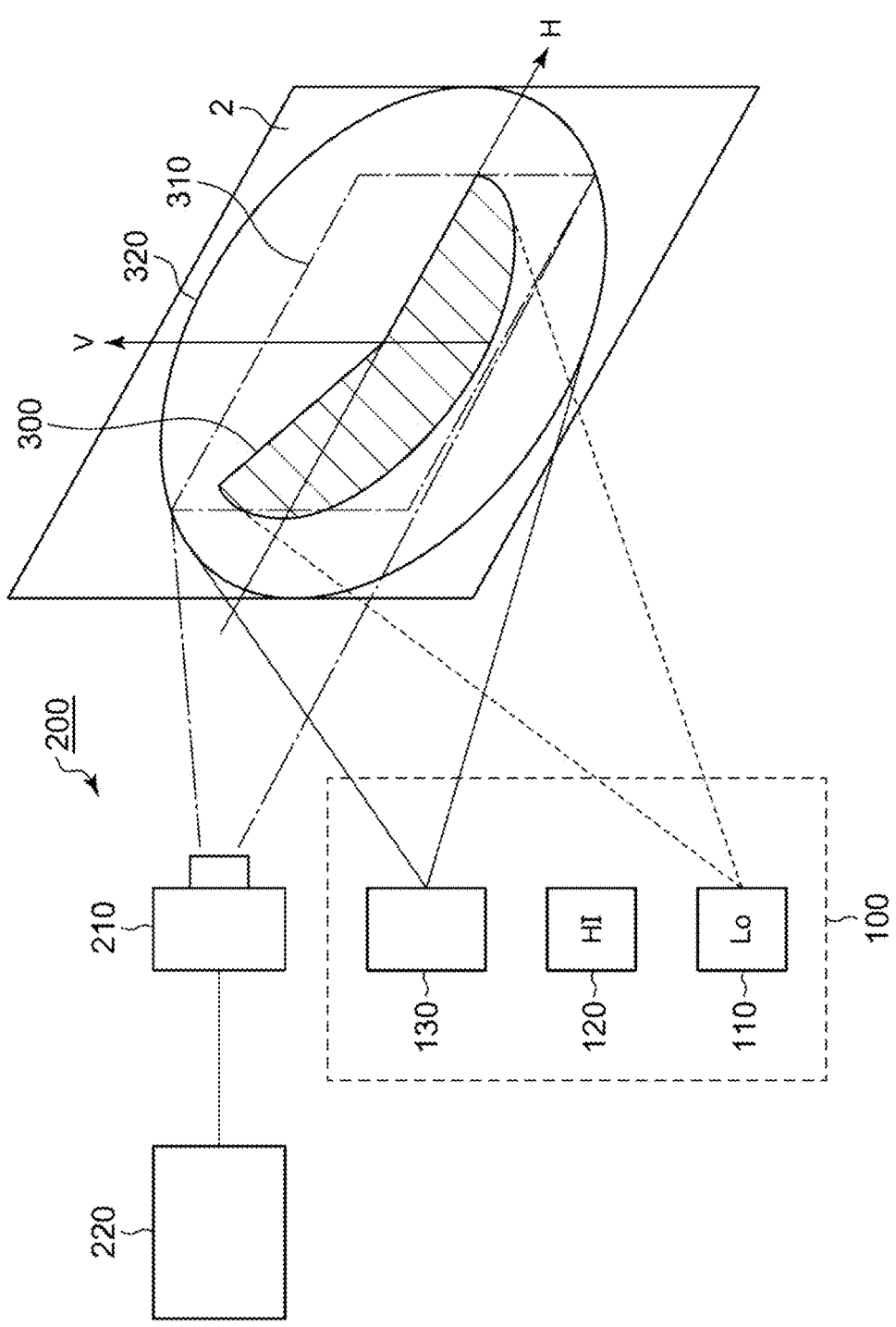
FIG. 1 is a block diagram illustrating a vehicle equipped with a vehicle lamp system according to an embodiment.

Some exemplary embodiments of the present disclosure will be outlined. This outline is intended for briefing some concepts of one or more embodiments, for the purpose of basic understanding of the embodiments, as an introduction before detailed description that follows, without limiting the scope of the invention or disclosure. This outline is not an extensive overview of all possible embodiments, and is therefore intended neither to specify key elements of all embodiments, nor to delineate the scope of some or all of the embodiments. For convenience, the term "one embodiment" may be used to designate a single embodiment (example or modified example), or a plurality of embodiments (Examples or Modified Examples) disclosed in the present specification.

One aspect of the present disclosure relates to a vehicle lamp system for use with a visible light camera. The vehicle lamp system has a white low-beam lamp, a white high-beam lamp, and a white imaging lamp. The visible light camera has an imaging range wider than an illumination range of the low-beam lamp; the imaging lamp has an illumination range that covers the imaging range of the visible light camera; and the imaging lamp has intensity lower than intensity of the low-beam lamp.

The visible light camera has considerably high sensitivity, which is typically ISO 3200 equivalent or higher, preferably ISO 6400 equivalent or higher, and more preferably ISO12800 equivalent or higher. The imaging lamp casts white beam which does not dazzle human eyes (or substantially invisible), and legally, which is faint enough to fall outside regulations on low-beam or high-beam, but is intense enough to be detectable by a visible light camera. This structure enables imaging over the entire angle of view of the visible light camera, even in the dark, by illuminating a range that covers the angle of view of the camera with the imaging lamp.

In one embodiment, light distribution by the imaging lamp has intensity maximized at a center of the imaging range of the visible light camera, and has intensity distribution in which intensity is gradually decreased as the distance from the center increases. In a visual field of the visible light camera, far objects tend to appear at or around the center, meanwhile nearer objects tend to appear in areas more distant from the center. Intensity of light attenuates in inverse proportion to the square of the distance. With the light distribution of the imaging lamp specified as described above, the far objects that appear at or around the center of the visual field, and the near objects that appear in the outer circumference of the visual field will have close levels of brightness.

In one embodiment, the low-beam lamp may be turned off during the imaging period with the imaging lamp. If a part of the visual field of the visible light camera overlaps the illumination range with low beam, the overlapped part would be overexposed to cause clipped whites (overexposure) in the image. In this case, the clipped whites may be suppressed by turning off the low-beam lamp, during the imaging period with the imaging lamp, that is, during the exposure.

In one embodiment, the intensity of the imaging lamp may be smaller than $\frac{1}{10}$ times the intensity of the low-beam lamp.

In one embodiment, illuminance of the imaging lamp may be 0.1 lux or lower at a distance of 25 m from the imaging lamp.

Embodiments

The present disclosure will be explained below on the basis of preferred embodiments, referring to the attached drawings. All similar or equivalent constituents, members and processes illustrated in the individual drawings will be given same reference numerals, so as to properly avoid redundant explanations. The embodiments are merely illustrative, and are not restrictive about the invention. All features and combinations thereof described in the embodiments are not always necessarily essential to the present invention.

FIG. 1 is a block diagram illustrating an automobile 200 equipped with a vehicle lamp system 100 according to an embodiment. The automobile 200 has a visible light camera 210, an arithmetic processing unit 220, and the vehicle lamp system 100.

The visible light camera 210 captures an image of a visual field ahead of the vehicle. The arithmetic processing unit 220 processes an image captured by the visible light camera 210, and detects presence, type, distance and so forth of an object in the visual field. Result of detection by the arithmetic processing unit 220 may be applicable to any use without limitation, such as automatic driving, and light distribution control of a head lamp. The arithmetic processing unit 220 may also display the image captured by the visible light camera 210, as a night vision on a display.

The vehicle lamp system 100 has a low-beam lamp 110, a high-beam lamp 120, and an imaging lamp 130. All of the low-beam lamp 110, the high-beam lamp 120, and the imaging lamp 130 emit white beam. The low-beam lamp 110 illuminates a low beam region, and the high-beam lamp 120 illuminates a high beam region. The low-beam lamp 110 and the high-beam lamp 120 may be structured as separate hardware, or may be structured while sharing the hardware, partially or entirely.

FIG. 1 illustrates a virtual perpendicular screen 2, with indication of a low-beam light distribution 300, an imaging range 310, and an imaging light distribution 320. The visible light camera 210 has an imaging range (angle of view) 320 wider than an illumination range (low-beam light distribution) 300 of the low-beam lamp 110. The imaging light distribution 320, which is the illumination range of the imaging lamp 130, is wider than the imaging range 310 of the visible light camera 210.

The intensity of the imaging lamp 130 is lower than the intensity of the low-beam lamp 110, so that the brightness of the imaging light distribution 320 is darker than the brightness of the low-beam light distribution 300. The visible light camera 210 has considerably high sensitivity, which is typically ISO 3200 equivalent or higher, preferably ISO 6400 equivalent or higher, and more preferably ISO12800 equivalent or higher. The imaging lamp 130 casts white beam which does not dazzle human eyes (or substantially invisible), and legally, which is faint enough to fall outside (or fulfill) requirements for low-beam or high-beam light distribution, but is intense enough to be detectable by the visible light camera 210.

For example, the intensity of the imaging lamp 130 is preferably lower than $\frac{1}{10}$ times the intensity of the low-beam lamp 110.

Luminous flux of the imaging lamp 130 is preferably 100 lumens or lower, or illuminance of the imaging light distribution 320 is preferably 0.1 lux or lower at a distance of 25 m from the imaging lamp 130. As a result, the imaging lamp 130 will be not applicable to the regulations regarding low-beam or high-beam light distribution. If applicable, the requirements for light distribution will be fulfilled.

The structure of the automobile 200 has been described.

Figure 2:
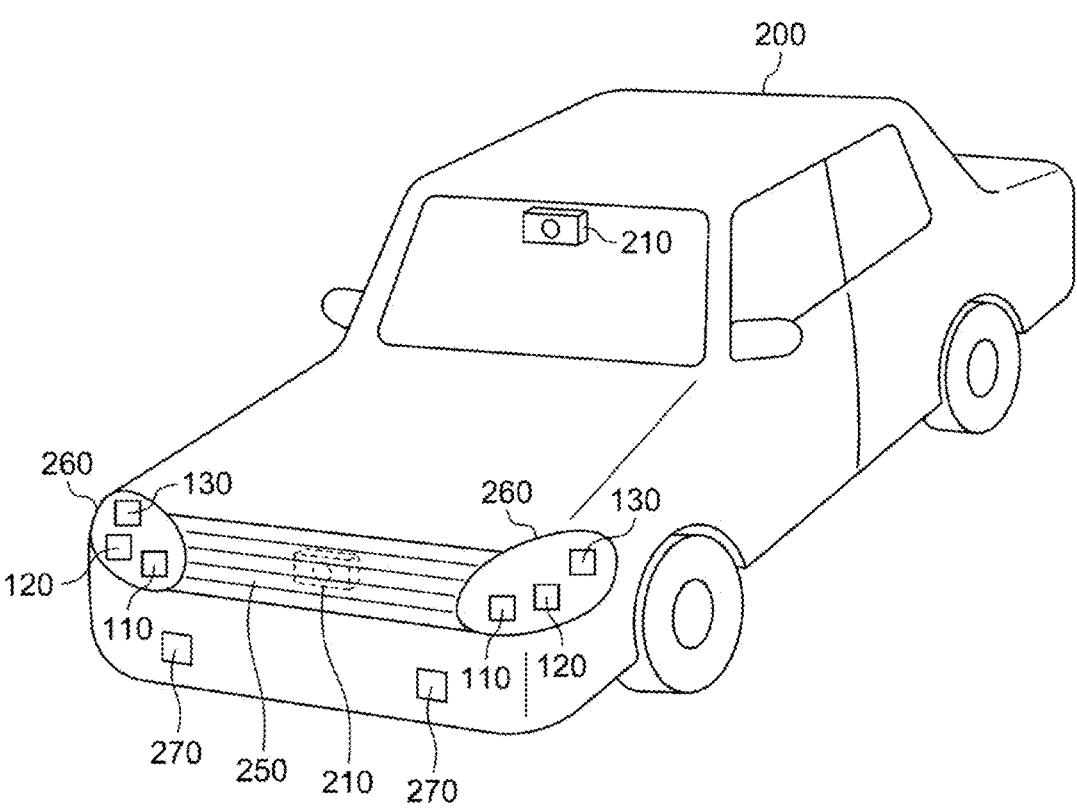
FIG. 2 is a perspective view illustrating an automobile equipped with the vehicle lamp system.

FIG. 2 is a perspective view illustrating the automobile 200 equipped with the vehicle lamp system 100. For example, the visible light camera 210 is arranged behind an interior lamp in a cabin. The visible light camera 210 may alternatively be arranged on a front grill 250.

In this example, the imaging lamp 130 is built within the head lamp 260 together with the low-beam lamp 110 and the high-beam lamp 120. Note that the imaging lamp 130 may alternatively be arranged outside the head lamp, without being limited in the head lamp. For example, the imaging lamp 130 may be integrated with a fog lamp 270.

The structure of the vehicle lamp system 100 has been described. Next, operations thereof will be explained.

Figure 3:
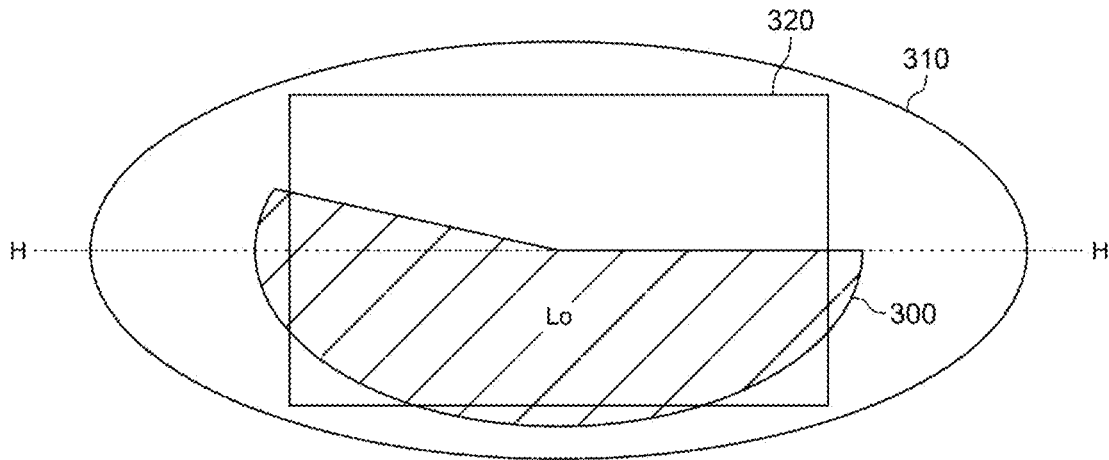
FIG. 3 is a diagram illustrating low beam light distribution, imaging light distribution, and imaging range.

FIG. 3 is a diagram illustrating the low-beam light distribution 300, the imaging range 310, and the imaging light distribution 320. The low-beam light distribution 300 is specified to illuminate an area below a horizontal cut-off line and an oblique cut-off line which intersect at an elbow point.

The conventional system not equipped with the imaging lamp 130 has caused underexposure locally in the imaging range 310 not overlapped with the low-beam light distribution 300, and has failed in capturing an object; or has resulted in difficulty of detection by a process with use of the arithmetic processing unit 220, if the object were captured anyhow.

In contrast in this embodiment, the entire imaging range 310 looks bright since the imaging light distribution 320 is cast by the imaging lamp 130. The visible light camera 210 can therefore create a bright image over the entire imaging range 310.

Figure 4:
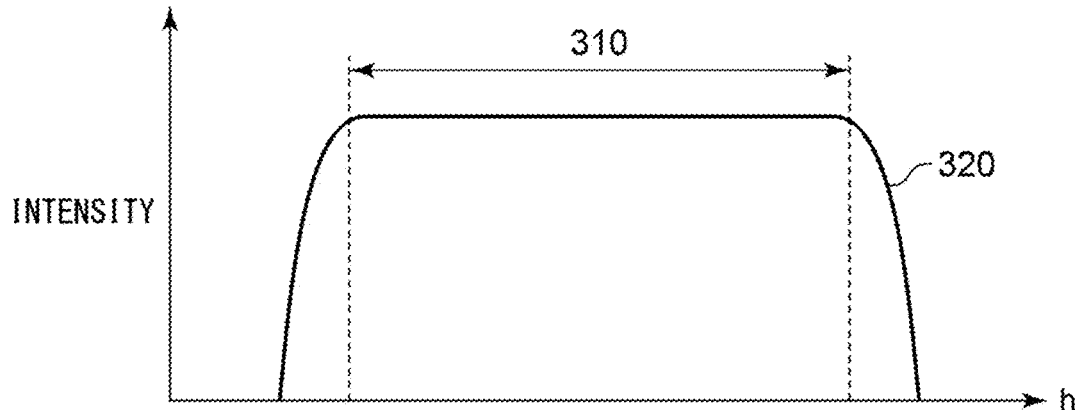
FIG. 4 is a chart illustrating an exemplary imaging light distribution created by an imaging lamp.

FIG. 4 is a chart illustrating an exemplary imaging light distribution 320 created by the imaging lamp. FIG. 4 illustrates the intensity distribution in the horizontal direction taken along line H-H. The imaging light distribution 320 in this example demonstrates an intensity distribution substantially uniform over the imaging range 310.

Figure 5:
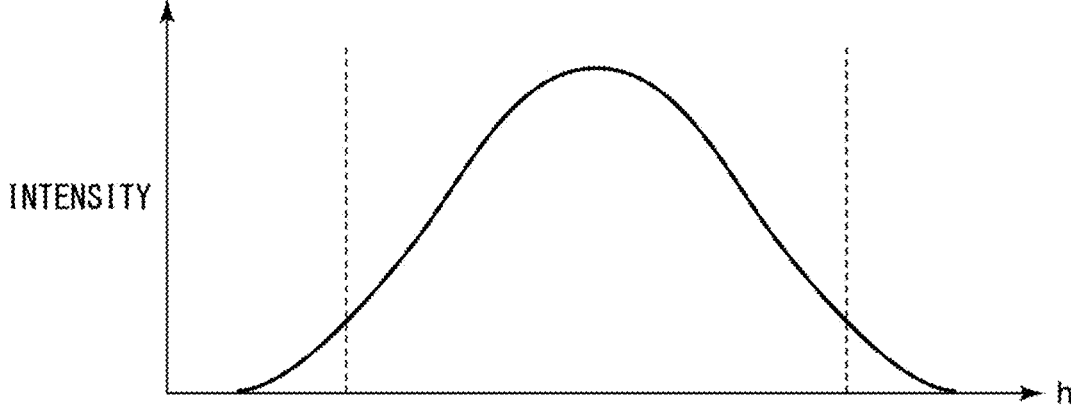
FIG. 5 is a chart illustrating another exemplary imaging light distribution created by an imaging lamp.

FIG. 5 is a chart illustrating another exemplary imaging light distribution 320 created by the imaging lamp. The imaging light distribution 320 in this example has intensity maximized at the center (center of the angle of view) of the imaging range 310 of the visible light camera 210, and has intensity distribution in which intensity is gradually decreased as the distance from the center increases.

In a visual field of the visible light camera 210, far objects tend to appear at or around the center, meanwhile nearer objects tend to appear in areas more distant from the center. Intensity of light attenuates in inverse proportion to the square of the distance. With the light distribution of the imaging lamp 130 specified as illustrated in FIG. 5, the far objects that appear at or around the center of the visual field, and the near objects that appear in the outer circumference of the visual field will have close levels of brightness. This successfully improves accuracy of image processing by the arithmetic processing unit 220. In use as a night vision, the user can equally recognize the far objects and the near objects.

Figure 6:
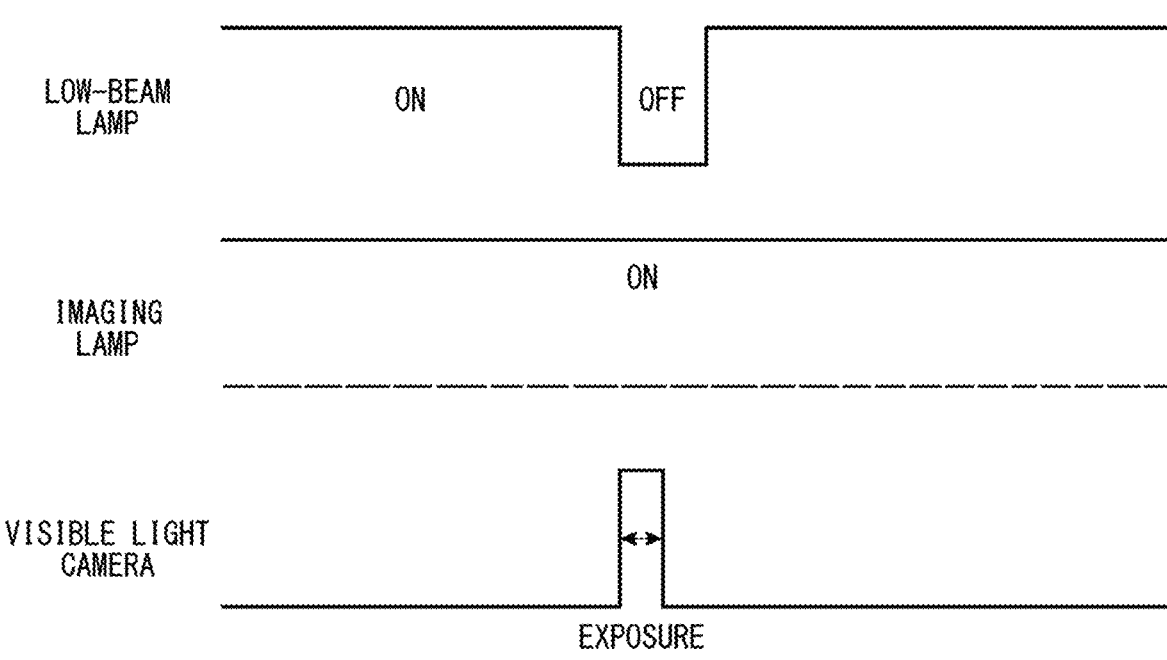
FIG. 6 is a chart illustrating an exemplary on/off control of the vehicle lamp system.

FIG. 6 is a chart illustrating an exemplary on/off control of the vehicle lamp system 100. The low-beam lamp 110 and the imaging lamp 130 may be kept turned on during traveling. This case would, however, cause overexposure locally in the imaging range 310 overlapped with the low-beam light distribution 300, thus producing clipped whites in the image. If so, it is recommendable to turn off the low-beam lamp 110, during the imaging period with the visible light camera 210, that is, during the exposure, as illustrated in FIG. 6. This successfully suppresses the overexposure in the visible light camera 210, and thus suppresses clipped whites in the image.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A vehicle lamp system for use with a visible light camera, the vehicle lamp system comprising:

a white low-beam lamp;

a white high-beam lamp; and a white imaging lamp;

the visible light camera having an imaging range wider than an illumination range of the low-beam lamp;

the imaging lamp having an illumination range wider than the imaging range of the visible light camera; and the imaging lamp having intensity lower than intensity of the low-beam lamp, wherein light distribution by the imaging lamp has intensity maximized at a center of the imaging range of the visible light camera, and has intensity distribution in which intensity is gradually decreased as the distance from the center increases.

2. The vehicle lamp system according to claim 1, wherein the low-beam lamp is structured to turn off, during an imaging period by the imaging lamp.

3. The vehicle lamp system according to claim 1, wherein intensity of the imaging lamp is smaller than $\frac{1}{10}$ times intensity of the low-beam lamp.

4. The vehicle lamp system according to claim 1, wherein illuminance of the imaging lamp is 0.1 lux or lower at a distance of 25 m.

* * * * *